United States Patent
Nguyen

Patent Number: 5,888,401
Date of Patent: Mar. 30, 1999

[54] METHOD AND APPARATUS FOR REDUCING MEMBRANE FOULING

[75] Inventor: Dong Donald Nguyen, Lawrenceville, N.J.

[73] Assignee: Union Camp Corporation, Wayne, N.J.

[21] Appl. No.: 714,752

[22] Filed: Sep. 16, 1996

[51] Int. Cl.$^6$ .................................................. B01D 61/00
[52] U.S. Cl. ........................... 210/650; 210/636; 210/90; 210/97; 210/106; 210/257.2
[58] Field of Search ..................... 210/636, 650, 210/651, 652, 97, 100, 102, 106, 295, 333.01, 333.1

[56] References Cited

U.S. PATENT DOCUMENTS

| | | | |
|---|---|---|---|
| 3,853,756 | 12/1974 | Stana | 210/636 |
| 3,956,114 | 5/1976 | Del Pico et al. | 210/636 |
| 4,169,789 | 10/1979 | Lerat | 210/137 |
| 4,342,651 | 8/1982 | Ahrens | 210/636 |
| 4,372,859 | 2/1983 | Sugimoto et al. | 210/333.01 |
| 4,708,790 | 11/1987 | Bray | 210/106 |
| 4,844,809 | 7/1989 | Ashina et al. | 210/636 |
| 4,921,610 | 5/1990 | Ford et al. | 210/636 |
| 5,047,154 | 9/1991 | Comstock et al. | 210/636 |
| 5,431,811 | 7/1995 | Tusini et al. | 210/90 |
| 5,702,597 | 12/1997 | Chevallet et al. | 210/90 |

*Primary Examiner*—Ana Fortuna
*Attorney, Agent, or Firm*—Dechert Price & Rhoads

[57] ABSTRACT

The present invention is directed, among other things, to methods for reducing fouling of a separation membrane having a concentrate side subject to a concentrate pressure (Pc) and a permeate side subject to permeate pressure (Pp), comprising raising an initial permeate pressure ($Pp_0$) to an increased permeate pressure ($Pp_1$). The present invention further provides a method of reducing fouling of a membrane having a concentrate side subject to a concentrate pressure (Pc) and a permeate side subject to permeate pressure (Pp), comprising periodically raising an initial permeate pressure ($Pp_0$) to an increased permeate pressure ($Pp_1$). Additionally, the present invention provides an improved apparatus for filtering a fluid and methods of reducing membrane fouling in a separation membrane using the apparatus, the improved apparatus comprising a feed inlet having a pump, a filtering apparatus, a concentrate line and a permeate line, the improvement comprising:

on the feed inlet, a first gauge for measuring pressure and a controller for controlling pressure of the fluid passing through the feed inlet pump or for controlling the speed of the feed inlet pump;

on the permeate line, a second gauge for measuring pressure and a pressure controller for controlling pressure of the fluid passing through the permeate line; and on the concentrate line, a third gauge for measuring pressure of the fluid passing through the concentrate line.

16 Claims, 1 Drawing Sheet

METHOD AND APPARATUS FOR REDUCING MEMBRANE FOULING

In numerous industries, such as the paper and pulp industry, filtering is used to separate out one component of a fluid from another component, such as dissolved or insoluble solids. One of the problems encountered with filtering a fluid is membrane fouling, that is, when the membrane becomes impaired or clogged and no longer functions according to the manufacturer's specifications. Several potential solutions have been devised to address this problem, including mechanically dislodging the material caked or gelled onto the membrane by sweeping an arm across the membrane or by subjecting the membrane to vibration. Nonetheless, even when a filtering apparatus is subjected to the known techniques of the prior art, the membrane fouls. Membrane fouling decreases filtration capacity by lowering the permeate flux and increases the down time required for cleaning. Further, membrane fouling shortens the lifetime of a membrane. There is therefore a continuing need for methods and apparatus for reducing membrane fouling, which are addressed by the present invention.

In the present invention, membrane fouling is reduced by increasing the pressure on the permeate side of the membrane, preferably at regular time intervals during filtration, such as use of an increased permeate pressure for about one minute every half hour. The permeate pressure can be increased with or without the use of a cleaning agent to reduce membrane fouling. For example, increased permeate pressure can be combined with a cleaning agent, when desired, to further reduce membrane fouling. Preferably, the cleaning agent is used less frequently than the frequency with which an increase in permeate pressure alone is applied, since the time intervals between cleaning of the membrane can be extended when the membrane fouling is reduced according to the present invention. Without being limited to a particular theory, it is believed that the increase in permeate pressure causes the feed flowing to the membrane to dislodge the material that causes membrane fouling.

SUMMARY OF THE INVENTION

The present invention is directed, among other things, to methods for reducing fouling of a separation membrane having a concentrate side subject to a concentrate pressure (Pc) and a permeate side subject to permeate pressure (Pp), comprising raising an initial permeate pressure ($Pp_0$) to an increased permeate pressure ($Pp_1$). In certain embodiments, the concentrate pressure (Pc) is also raised. Preferably, Pc is maintained at a higher pressure than Pp. Preferably, the difference between Pc and $Pp_1$ is about 5 p.s.i. to about 60 p.s.i.; more preferably, the difference is about 10 p.s.i. to about 40 p.s.i.; and most preferably, the difference between Pc and $Pp_1$ is about 20 p.s.i. to about 30 p.s.i.

The methods of the invention preferably include raising an initial Pp, $Pp_0$, to $Pp_1$ for a duration of at least about 1 second, and after that time period, lowering Pp to $Pp_2$, which is preferably the same as $Pp_0$. More preferably, the time period is at least about 1 minute. Preferably, Pp is raised to $Pp_1$ at least about once per hour, and more preferably, Pp is raised to $Pp_1$ at least about three times per hour. In preferred embodiments, Pp is raised to $Pp_1$ automatically rather than manually.

In preferred methods of the invention, Pp is raised by partially closing a valve on the permeate side of the membrane. Preferably, at least one pressure indicator is used in the methods of the invention. In preferred embodiments, the methods include use of a relief valve on a permeate line.

In preferred embodiments of the methods of the invention, the methods for reducing membrane fouling are combined with known methods of reducing membrane fouling, such as pre-treatment before filtration and subjecting the membrane to a shearing force, such as vibration.

The methods of the invention can be used, for example, for microfiltration, ultrafiltration, nanofiltration or reverse osmosis. Further, the methods of the invention can be used, for example, with asymmetric or symmetric membranes. Additionally, the methods of the invention can be used, for example, with multiple membranes.

The methods of the invention can be used in numerous industries, including, for example, paper or pulp products, sewage treatment or desalination, processing a food product, such as milk or juice, processing a biological or pharmaceutical product such as blood, antibiotics, hormones or enzymes, processing a chemical product, such as a dye, or for metal working. Preferably, the methods are used with membranes used for separation of suspended or dissolved solids having a concentration of at least about 0.4%, and in certain embodiments, a concentration of at least about 4%.

The methods of the invention preferably include use of at least one cleaning agent, such as a cleaning agent is selected from the group consisting of detergents, acids and bases.

The present invention further provides a method of reducing fouling of a membrane having a concentrate side subject to a concentrate pressure (Pc) and a permeate side subject to permeate pressure (Pp), comprising periodically raising an initial permeate pressure ($Pp_0$) to an increased permeate pressure ($Pp_1$).

Additionally, the present invention provides an improved apparatus for filtering a fluid comprising a feed inlet having a pump, a filtering apparatus, a concentrate line and a permeate line, the improvement comprising:

on the feed inlet, a first gauge for measuring pressure and a controller for controlling pressure of the fluid passing through the feed inlet pump or for controlling the speed of the feed inlet pump;

on the permeate line, a second gauge for measuring pressure and a pressure controller for controlling pressure of the fluid passing through the permeate line; and on the concentrate line, a third gauge for measuring pressure of the fluid passing through the concentrate line. Preferably, the apparatus further comprises a comparing device for comparing the pressure in the concentrate line and the pressure in the permeate line wherein such comparing device together with the second gauge and the third gauge form a feedback loop with the pressure controller on the permeate line. Further, the apparatus preferably includes a flow meter on each of the feed inlet, permeate line and concentrate line. Preferably, the pressure controller on the feed inlet or the permeate line comprises a valve. In certain preferred embodiments, the pressure controller on each of the feed inlet or the permeate line comprises two valves. In certain embodiments, the controller for controlling the speed of the feed inlet pump comprises a drive control. Additionally, the concentrate line preferably also comprises a valve. In preferred embodiments, the apparatus includes flow meters on the permeate and concentrate lines which form a feedback loop with the valve on the concentrate line. Preferably, the controllers on the apparatus are computerized.

The invention further provides a method of reducing membrane fouling in a separation membrane having a concentrate side subject to a concentrate pressure (Pc) and a permeate side subject to permeate pressure (Pp), comprising:

provided an improved apparatus, described above, wherein the separation membrane is located in the filtering apparatus; and raising the pressure of the fluid passing through the permeate line using the pressure controller on the permeate line.

Additionally, the invention provides a method of reducing membrane fouling in a separation membrane having a concentrate side subject to a concentrate pressure (Pc) and a permeate side subject to permeate pressure (Pp), comprising:

providing an improved apparatus, described above, wherein the separation membrane is located in the filtering apparatus; and raising an initial permeate pressure ($Pp_0$) of the fluid passing through the permeate line to an increased permeate pressure ($Pp_1$) using the pressure controller on the permeate line, wherein the comparing device for comparing the pressure in the concentrate line and the pressure in the permeate line causes the pressure controller on the permeate line to reduce the pressure in the permeate line. Preferably, Pc is greater than Pp. In preferred embodiments, the difference between Pc and $Pp_1$ is about 5 p.s.i. to about 70 p.s.i., and more preferably, the difference between Pc and $Pp_1$ is about 10 p.s.i. to about 50 p.s.i., and most preferably, the difference between Pc and $Pp_1$ is about 20 p.s.i. to about 30 p.s.i. Preferably, $Pp_0$ is about ambient pressure.

Preferably, Pp is raised to $Pp_1$ for a time period of at least about 1 second, and after that time period, Pp is lowered, using the pressure controller on the permeate line, to $Pp_2$, which is preferably the same as $Pp_0$.

In preferred embodiments of the above methods, the pressure controller is a valve and the permeate pressure is increased by at least partially closing the valve.

Further, in preferred embodiments, the methods comprise providing at least one cleaning agent to the filtering apparatus for cleaning the membrane.

DETAILED DESCRIPTION

Figure 1:
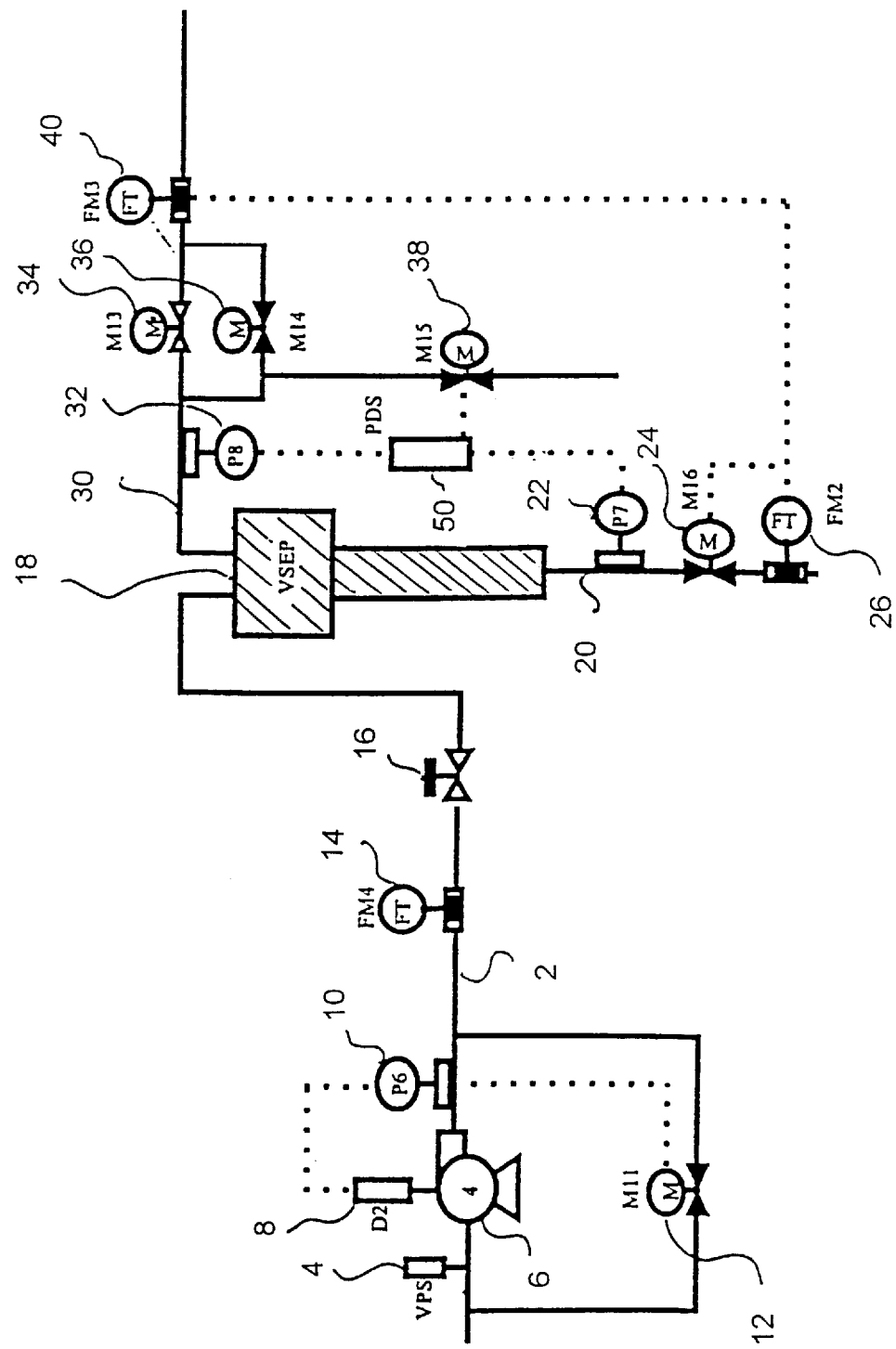
FIG. 1 is a diagrammatic representation of an embodiment of an apparatus of the invention.

For the purposes of this application, the terms listed below shall have the following meaning:

Back flushing Reversal of the flow direction through the membrane.

Cleaning agent A compound or mixture of compounds that are capable of reducing membrane fouling.

Concentrate The fraction of the feed that does not pass through the membrane.

Feed The flow that is presented to the membrane for filtration.

Membrane fouling Membrane fouling occurs when retained material is accumulated on the membrane, which decreases transport through the membrane. Membrane fouling can alter membrane selectivity, for example, if a gel layer is formed on the membrane. Membrane fouling can occur, for example, due to precipitation, chemical reaction, corrosion and crystallization.

Permeate The fraction of the feed that passes through the membrane.

The present invention is directed, among other things, to methods for reducing fouling of a separation membrane having a concentrate side subject to a concentrate pressure (Pc) and a permeate side subject to permeate pressure (Pp), comprising raising an initial permeate pressure ($Pp_0$) to an increased permeate pressure ($Pp_1$). In certain embodiments, the concentrate pressure (Pc) is also raised. Preferably, Pc is maintained at a higher pressure than Pp. Preferably, the difference between Pc and $Pp_1$ is about 5 p.s.i. to about 60 p.s.i.; more preferably, the difference is about 10 p.s.i. to about 40 p.s.i.; and most preferably, the difference between Pc and $Pp_1$ is about 20 p.s.i. to about 30 p.s.i. The present invention provides for the ability to clean the membrane without the requirement of a cleaning agent, and allows the system to be cleaned regularly while during regular use of the filter assembly. The invention provides, for example, longer life of the membrane, and greater efficiency of the filtration operation. Further, for example, preferred methods of the invention can be used with all types of membranes and the methods are more suitable than back flushing for certain types of membranes, such as thin film composite membranes.

The methods of the invention preferably include raising an initial Pp, $Pp_0$, to $Pp_1$ for a duration of at least about 1 second, and after that time period, restoring Pp to $Pp_2$, which is preferably the same as $Pp_0$.

More preferably, the time period is at least about 1 minute. Preferably, Pp is raised to $Pp_1$ at least about once per hour, and more preferably, Pp is raised to Pp1 at least about three times per hour. Most preferably, Pp is raised to $Pp_1$ for about one minute every half hour. In preferred embodiments, Pp is raised to $Pp_1$ automatically rather than manually, and most preferably, using programmable logic control or a computer.

Thus, the present invention provides for a pulse of an increased permeate pressure as a cleaning method which need not include a cleaning agent. Preferably, the pulse is generated over regular time intervals, as described above. The permeate pressure can be increased in a pulse, such as a one-minute pulse, in regular intervals during normal operation of the filtration assembly without significantly interrupting the overall flow of the system. Additionally, increased permeate pressure can be combined with a cleaning agent, when desired, to further reduce membrane fouling.

In preferred methods of the invention, Pp is raised by partially closing a valve on the permeate side of the membrane. Preferably, at least one pressure indicator is used in the methods of the invention. In preferred embodiments, the methods include use of at least one relief valve on a permeate line. The valves used in the invention can be on/off valves or modulating valves. The valves may be, for example, manually actuated, air actuated, such as opened or closed by compressed air, or electrically actuated, such as opened or closed by an electrical motor. In a preferred method of operating the invention, the valves for controlling pressure at a given portion of the apparatus comprise two valves, one of wider bore and capable of coarse flow and pressure adjustment, and the other of narrower bore and capable of finer flow and pressure adjustment. In the $Pp_0$ or $Pp_2$ modes of operation, i.e., normal filtration, both of these valves are fully open. Preferably, the valves are monitored and controlled by a programmed logic control or by a computer, and preferably, the valves can be monitored and controlled from a remote location. For example, the control signal sent to the valve actuator and the valve position are preferably monitored and controlled by a remote location. Preferably, the system includes alarms for alerting the operator when the pressure, such as the permeate pressure (Pp) nears a point that may cause difficulties in operation, such as loss of membrane integrity.

In other embodiments of the invention, Pp is raised using a gas, such as nitrogen gas or compressed air.

In preferred embodiments of the methods of the invention, the methods for reducing membrane fouling are combined with known methods of reducing membrane fouling, such as pre-treatment before filtration and subjecting the membrane to mechanical dislodging, for example, by increasing feed flow velocity, by using a rotating arm that wipes the membrane surface, such as that provided by ABB Flootek (Mälmo, Sweden) by centrifugal force, for example, by spinning the membrane module, such as that provided by Spintek (Long Beach, Calif.), through the use of beads in a fluidized bed or, in preferred embodiments, by a shearing force, for example, vibration, such as that provided by New Logic (Emeryville, Calif.). Pre-treatment includes, for example, filtration, such as through a sand filter, and pH adjustment.

The methods of the invention can be used, for example, for microfiltration, ultrafiltration, nanofiltration or reverse osmosis. The methods of the invention can be used, for example, with dissolved or insoluble, suspended solids. Additionally, the methods of the invention can be used, for example, with diafiltration or tangential (cross-flow) filtration. Further, the methods of the invention can be used with asymmetric or symmetric membranes and with composite membranes having more than one layer or membranes having only one layer. The methods of the invention can be used, for example, with membranes made of ceramic or a polymeric material, such as polystyrene, polyester, polyamide, polysulfones or cellulose acetate. Further, the methods of the invention can be used, for example, with multiple membranes. In preferred embodiments, the methods of the present invention are used in the pulp and paper industry, and the membrane is preferably made of a polysulfone material, such as the membranes provided by Desal, for instance, the Desal DL membrane (San Diego, Calif.) or the polyamide membranes provided by Trisep (San Diego, Calif.), such as the ACM4 or TS40 membranes.

The membrane unit construction can comprise, for example, tubes, plates or hollow fibers, or it can be spiral-wound. In certain preferred embodiments, the membrane unit comprises a plate and frame system with a spacer or frame between membranes that are supported by a support plate.

The methods of the invention can be used in numerous industries, including, for example, paper or pulp products, sewage treatment or desalination, the chemical industry, the metal working industry, processing a food product, or processing a biological or pharmaceutical product. Use with paper or pulp products is preferred, and includes, for example, excess whitewater, primary clarifier effluent, secondary and tertiary treated effluent, fiberboard effluent, evaporator acid concentrate, spent sulphite liquor, Kraft black liquor and Kraft bleach effluents. Chemical products include, for example, dye stuffs and pigments. Metal working products include, for example, heavy metals, galvanic waste water, oil emulsions and electrophoretic paint. Biological or pharmaceutical products include, for example, blood, insulin, albumin, amino acids, antibiotics, hormones or enzymes. Food products include, for example, milk, whey, juice, beer, eggs, coffee, wine, vinegar and starch. Preferably, the methods are used with membranes used for separation of suspended or dissolved solids having a concentration of at least about 0.4% wt/wt, and in other embodiments, the methods are used for separation of about 4% wt/wt suspended or dissolved solids, and in further embodiments, the methods are used for separation of up to about 10% or up to about 30% suspended or dissolved solids, depending upon the physical and chemical nature of the solid. The methods of the invention can be used when filtration is used, for example, to recover valuable products from process effluents, to process, improve or modify a product, for concentration, pollution control or clarification of liquids.

In certain preferred embodiments of the invention, the methods and apparatus are used in the pulp and paper industry. Preferably, the feed temperature ranges from ambient to about 122° F., and more preferably from about 80° F. to about 120° F., the pH ranges from about 1 to about 12, and more preferably, from about 1–2 or 11–12 during chemical cleaning, and the feed pressure ranges from about 200 to about 500 p.s.i. During the cleaning process of the invention in which membrane fouling is reduced, preferably, the concentrate pressure is about 475 p.s.i. while the permeate pressure is raised, and preferably the permeate pressure is raised to about 445 p.s.i. Preferably, the feed flow is limited to the rate recommended for the particular filter being used. For example, in preferred embodiments in which a VSEP (New Logic) membrane plate filter assembly system is used, the system is a vibrational enhanced shear system that has about 1000 square feet of membrane, and the feed flow rate to the filter assembly is preferably below about 100 gallons per minute (gpm) and more preferably, below about 90 gpm. Preferably, concentrate flow out of the filter assembly is less than about 40 gpm and more preferably, less than about 30 gpm in order to protect the integrity of the filter assembly. Preferably, the membrane surface area is at least about 1000 square feet.

The methods of the invention preferably include use of at least one cleaning agent, such as a detergent, acidic compound, or a basic compound. Preferred cleaning agents include detergents, and preferably, a mixture of organic surfactants such as Micro (Burlington, N.J.), or Triox (Trisep) a base such as sodium hydroxide, an acid such as sulfuric acid, or a mixture of a detergent and an acid or base. In certain preferred embodiments, Micro is used as the cleaning agent at a pH of about 11 to about 12. Preferably, the use of a cleaning agent is automated, and is preferably done at a regular frequency, from at least once a month, for example, to once every day.

The present invention further provides a method of reducing wear of a membrane having a concentrate side subject to a concentrate pressure (Pc) and a permeate side subject to permeate pressure (Pp), comprising periodically raising an initial permeate pressure ($Pp_0$) to an increased permeate pressure ($Pp_1$). For example, in the preferred embodiment described above with the VSEP system, when the permeate pressure is raised according to the invention for about 1 minute about every half hour, the period of time between cleaning the membrane with a cleaning agent can be lengthened from about every 2 days to about every 14 days.

Additionally, the present invention provides an improved apparatus for filtering a fluid comprising a feed inlet having a pump, a filtering apparatus, a concentrate line and a permeate line, the improvement comprising:

on the feed inlet, a first gauge for measuring pressure and a controller for controlling pressure of the fluid passing through the feed inlet pump or for controlling the speed of the feed inlet pump;

on the permeate line, a second gauge for measuring pressure and a pressure controller for controlling pressure of the fluid passing through the permeate line; and on the concentrate line, a third gauge for measuring pressure of the fluid passing through the concentrate line. Preferably, the apparatus further comprises a comparing device for comparing the pressure in the concentrate line and the pressure in the permeate line wherein such comparing device together with the second gauge for measuring pressure in the permeate line and the third gauge for measuring pressure in the concentrate line form a feedback loop with the pressure controller on the permeate line. Further, the apparatus preferably includes a flow meter on each of the feed inlet, permeate line and concentrate line. Preferably, the pressure controller on the feed inlet or the permeate line comprises a valve. In certain preferred embodiments, the pressure controller on each of the feed inlet or the permeate line comprises two valves. In certain embodiments, the controller for controlling the speed of the feed inlet pump comprises a drive control. Additionally, the concentrate line preferably also comprises a valve. In preferred embodiments, the apparatus includes flow meters on the permeate and concentrate lines which form a feedback loop with the valve on the concentrate line. Preferably, the controllers on the apparatus are computerized.

An example of a preferred apparatus of the invention is depicted diagrammatically in FIG. 1. Feedback loops are illustrated in this figure through the use of dotted lines. Referring to FIG. 1, the feed inlet line 2 has a vacuum pressure switch 4 located before the pump 6 which has a pump drive control 8. A pressure gauge 10 measures the pressure of the fluid in the feed inlet line, exiting the pump 6. The pressure gauge 10 determines control of the pump drive control 8 through a feedback loop. The pressure gauge 10 also controls a modulated valve 12 through a feedback loop that includes a process integral and differential control (not shown) on the modulated valve 1 2. The feed inlet line 2 also has a flow meter 14 for measuring the flow of the fluid exiting the pump 6. The feed inlet line 2 also has an optional on-off valve 16. The feed inlet line 2 is connected to a filter assembly 18, which has two lines exiting from it, a concentrate line 20 and a permeate line 30. The concentrate line 20 includes a pressure gauge 22, a modulated valve 24 and a flow meter 26. The permeate line 30 includes a pressure gauge 32, a first modulated valve 34, a second modulated valve 36 and a modulated relief valve 38. Preferably, the second modulated valve 36 is smaller than the first modulated valve 34 for fine control of the pressure in the permeate line. The permeate line also has a flow meter 40. The apparatus further includes a pressure differential switch 50 which is connected, via a feedback loop, to the pressure gauge 22 on the concentrate line 20 and the pressure gauge 32 on the permeate line 30 as well as the modulated relief valve 38 on the permeate line 30. Additionally, the flow meter 40 on the permeate line 30 is connected, via a feedback loop, to the flow meter 26 on the concentrate line 20 and the modulated valve 24 on the concentrate line 20 in order to maximize flow during normal operating conditions.

In preferred embodiments of the above-described apparatus, the flow meters 14, 26 and 40 have both a flow sensor and a flow indicator transmitter and the pressure gauges include both a pressure indicator and a pressure transmitter. Preferably, the flow and pressure transmitters transmit their signals to a computer. Further, the apparatus preferably includes at least one temperature gauge, pH indicator and conductivity indicator.

In certain preferred embodiments, the apparatus includes a valve on the feed line that empties into a drain and a valve on the concentrate line that empties into a drain (not shown). Valve 38 also preferably goes to a drain.

Preferably, the valve 12 on the feed line 2 is a modulated pressure valve having a pressure indicator controller through which a computer controls the position of the valve, and a current to pressure converter which controls the opening and closing of the valve by air pressure since the valve is preferably air actuated. The valve 36 on the permeate line 30 is also preferably a modulated pressure valve having a pressure indicator controller and a current to pressure converter. Valves 34 and 38 on the permeate line 30 are preferably computer controlled on-off valves, although they can be modulated valves, for example, if desired. Preferably, the valve 24 on the concentrate line 20 is a flow valve having a flow indicator controller through which a computer controls the position of the valve, and a current to pressure converter which controls the opening and closing of the valve by air pressure since the valve is preferably air actuated.

During operation of the above-described apparatus, in order to clean the membrane by increasing the permeate pressure, the following steps are taken in a preferred embodiment of the methods of the invention. First, the pump drive control 8 is turned off, causing the feed pressure to drop slightly, and the process integral and differential on modulated valve 12 is turned on in order to maintain the pump at a selected speed (rpm) and to recirculate the fluid back to the pump inlet since a lower volume is generated in the permeate and concentrate lines during periods of high permeate pressure. The modulated valve 24 on the concentrate line 20 is adjusted to a fixed set point wherein the concentrate flow does not differ significantly from the concentrate flow during normal filtering procedures (preferably no more than about 2–3 gallons per minute higher than normal) and such that the feed pressure drops only slightly below normal operating pressure (preferably dropping by no more than about 10–20 p.s.i.) when the permeate flow is restricted. Optionally, the process integral and differential control (not shown) of the second modulated valve 36 on the permeate line 30 is activated and the valve is partially closed, thereby increasing the pressure in the permeate line 30. Then, the first modulated valve 34 is fully closed. Preferably, two valves are used with a transition period of increased pressure provided by partially closing one valve before fully closing another valve in order to avoid changing the pressure differential across the membrane too quickly. Preferably, the two modulated valves 34 and 36 are closed over a period of at least about 10 seconds and the process integral and differential on modulated valve 12 is turned on substantially simultaneously with closing the valves 34 and 36 in order to avoid a pressure shock to the filter assembly. The time period during which the valves 34 and 36 are closed is preferably as short as possible without damaging the system. Preferably, valve 36 is sufficiently open to allow about 0.5 liter per minute of permeate to exit the permeate line in order to maintain integrity of the membrane unit.

The membrane integrity is protected by regulating the pressure in the permeate line 30, which is controlled by the pressure differential switch 50. The pressure differential switch 50 compares the permeate pressure from the pressure gauge 32 and the concentrate pressure from the pressure gauge 22. If the difference in pressure between the concentrate line and the permeate line becomes too small, the pressure differential switch 50 triggers the opening of the pressure relief valve 38 on the permeate line 30 to decrease the permeate pressure and thereby avoid potential destruction of the membrane (not shown). Optionally, a second pressure relief valve may also be included (not shown). In addition to opening the relief valve 38, the pressure differential switch 50 preferably also stops vibration of the filter assembly 18, if necessary, to prevent vibration at a low pressure differential across the membrane.

At the end of the selected time period for increasing the permeate pressure, the initial permeate pressure is substantially restored to normal operating conditions as follows. The first modulated valve 34 on the permeate line 30 is fully opened, the second modulated valve 36 on the permeate line 30 is fully opened, the feedback loop including the modulated valve 12 on the feed line 2 is deactivated, the feedback loop including the modulated valve 24 on the concentrate line 20 is reactivated, and the feedback loop involving the pressure gauge 10 and the modulated valve 12 on the feed line 2 is deactivated. Finally, the feedback loop involving the pressure gauge 10 and the pump drive control 8 is reactivated.

For example, during use of the VSEP system for filtering wastewater in the pulp and paper industry, the permeate pressure is generally at about 0 p.s.i. during normal operation. During use of the methods of the invention in which membrane fouling is reduced, the permeate pressure is raised to about 445 p.s.i. The concentrate pressure, about 475 p.s.i., remains the same both during normal operation and during use of the methods of the invention. The feed pressure is generally about 500 p.s.i. during normal operation, and during use of the methods of the invention, the feed pressure drops to about 480 p.s.i.

In addition to cleaning the membrane during operation of the apparatus in which the feed is filtered, the filtration system can instead be converted to a cleaning mode using a cleaning agent. Thus, instead of using typical feed fluid, a cleaning agent can optionally be used while the permeate pressure is increased to further clean the membrane. The cleaning agent can be pumped from a separate tank (not shown) into the filter assembly 18. Preferably, the cleaning agent is passed through the filter assembly 18 for at least about 15 minutes, and preferably, no more than about 3 hours. Most preferably, the cleaning agent is circulated through the filter assembly for about 30 minutes while the permeate pressure is at $Pp_1$ (increased pressure). More than one cleaning agent can be used, and the process can be repeated more than once, if desired. Preferably, a cleaning cycle includes a rinse, for example, with permeate or with a solvent, followed by cleaning with cleaning agent and a second rinse. Preferably, the cleaning mode using a cleaning agent is performed about once every 2 weeks, or as needed.

The invention further provides a method of reducing membrane fouling in a separation membrane having a concentrate side subject to a concentrate pressure (Pc) and a permeate side subject to permeate pressure (Pp), comprising:
providing an apparatus for filtering a fluid comprising a feed inlet having a pump, a concentrate line, a permeate line, and a filtering apparatus comprising a separation membrane, a first gauge for measuring pressure and a controller for controlling pressure of the fluid passing through the feed inlet pump or for controlling the speed of the feed inlet pump, a second gauge for measuring pressure and a pressure controller for controlling pressure of the fluid passing through the permeate line and a third gauge for measuring pressure of the fluid passing through the concentrate line; and
raising the pressure of the fluid passing through the permeate line using the pressure controller on the permeate line.

Additionally, the invention provides a method of reducing membrane fouling in a separation membrane having a concentrate side subject to a concentrate pressure (Pc) and a permeate side subject to permeate pressure (Pp), comprising:
providing an apparatus for filtering a fluid comprising a feed inlet having a pump, a concentrate line, a permeate line, and a filtering apparatus comprising a separation membrane, a first gauge for measuring pressure and a controller for controlling pressure of the fluid passing through the feed inlet pump or for controlling the speed of the feed inlet pump, a second gauge for measuring pressure and a pressure controller for controlling pressure of the fluid passing through the permeate line, a third gauge for measuring pressure of the fluid passing through the concentrate line and a comparing device for comparing the pressure in the concentrate line and the pressure in the permeate line and wherein such comparing device together with the second gauge and the third gauge form a feedback loop with the pressure controller on the permeate line; and
raising an initial permeate pressure ($Pp_0$) of the fluid passing through the permeate line to an increased permeate pressure ($Pp_1$) using the pressure controller on the permeate line, wherein the comparing device for comparing the pressure in the concentrate line and the pressure in the permeate line causes the pressure controller on the permeate line to reduce the pressure in the permeate line. Preferably, Pc is greater than Pp, especially when the methods of the invention are used with an asymmetric, composite membrane made of more than one layer. Pc need not be greater than Pp, for example, when a singlelayered membrane is used. In preferred embodiments, the difference between Pc and $Pp_1$ is about 5 p.s.i. to about 60 p.s.i., and more preferably, the difference between Pc and $Pp_1$ is about 10 p.s.i. to about 40 p.s.i., and most preferably, the difference between Pc and $Pp_1$ is about 20 p.s.i. to about 30 p.s.i.

Preferably, Pp is raised to $Pp_1$ for a time period of at least about 1 second, and after that time period, Pp is lowered, using the pressure controller on the permeate line, to $Pp_2$, which is preferably the same as $Pp_0$.

In preferred embodiments of the above methods, the pressure controller is a valve and the permeate pressure is increased by at least partially closing the valve, preferred valves being the same as those described above.

Further, in preferred embodiments, the methods comprise providing at least one cleaning agent to the filtering apparatus for cleaning the membrane, preferred cleaning agents being the same as those described above.

Certain useful operating parameters, where inlet pressure is 500 psi and the increase in permeate pressure occurs once every 30 min, are as follows:

| Process | Type of Membrane | Cleaning Solution | pH Cleaning | Temp. | Duration |
| --- | --- | --- | --- | --- | --- |
| River | TriSep ACM4 | Micro | pH 11 | 80° F. | 1 min |
| Whitewater | DL, Desal | Micro | pH 11 | 120° F. | 1 min |
| Bleach | DL, Desal | Micro | | 100° F. | 1 min |
| Secondary Treatment Effluent | TS40, TriSep | Micro, pH 12 | pH 12 | 80° F. | 2 min |
| Primary Treatment Effluent | TS40, TriSep | Micro, pH 12 | pH 12 | 90° F. | 1 min |

We claim:

1. An improved apparatus for producing a concentrate and a permeate from a particulate-containing feed fluid comprising a feed inlet having a feed inlet pump having a pump drive controller, a filtering apparatus, a concentrate line and a permeate line, and further comprising:

on the feed inlet,
a first pressure gauge for measuring pressure of fluid passing through the feed inlet pump and
a controller for controlling pressure of the fluid passing through the feed inlet pump responsive to pressure measured by the first pressure gauge and including the pump drive controller for controlling the speed of the feed inlet pump;

on the permeate line,
a second pressure gauge for measuring pressure and a pressure controller for controlling pressure of the fluid passing through the permeate line; and on the concentrate line,
a third pressure gauge for measuring pressure of the fluid passing through the concentrate line;

wherein the apparatus further comprises a comparing device for comparing the pressure in the concentrate line and the pressure in the permeate line and wherein such comparing device together with the second gauge and the third gauge form it feedback loop with the pressure controller on the permeate line to control pressure of the liquid passing through the permeate line.

2. The improved apparatus of claim 1, further comprising a flow meter on each of the feed inlet, permeate line and concentrate line.

3. The improved apparatus of claim 2, wherein the pressure controller on the feed inlet or the permeate line comprises a valve.

4. The improved apparatus of claim 3, wherein the concentrate line further comprises a valve.

5. The improved apparatus of claim 4, wherein the flow meters on the permeate and concentrate lines form a feedback loop with the valve on the permeate line.

6. The improved apparatus of claim 1, wherein the controller for controlling the speed of the feed inlet pump comprises a drive control.

7. The improved apparatus of claim 1, wherein said controllers are computerized.

8. A method of reducing membrane fouling in a separation membrane having a concentrate side subject to a concentrate pressure (Pc) and a permeate side subject to permeate pressure (Pp), comprising:

providing an apparatus for filtering a fluid comprising a feed inlet having a pump, a filtering apparatus, a concentrate line, and a permeate line that has a first gauge for measuring pressure and a pressure controller for controlling pressure of fluid passing through the permeate line ad including a comparing device, wherein said separation membrane is located in said filtering apparatus;

passing said fluid through said apparatus; and raising an initial permeate pressure ($Pp_0$) of the fluid passing through the permeate line to an increased permeate pressure ($Pp_1$) using the pressure controller in the permeate line, wherein the comparing device compares the pressure in the concentrate line and the pressure in the permeate line and based on the pressure differential causes the pressure controller to control the pressure in the permeate line, by changing the pressure from $Pp_1$ to a reduced permeate pressure of $Pp_2$.

9. The method of claim 8 wherein Pc is greater than Pp.

10. The method of claim 8 wherein the difference between Pc and $Pp_1$ is about 5 p.s.i. to about 60 p.s.i.

11. The method of claim 8 wherein the difference between Pc and $Pp_1$ is about 10 p.s.i. to about 40 p.s.i.

12. The method of claim 8 wherein the difference between PC and $Pp_1$ is about 20 p.s.i. to about 30 p.s.i.

13. The method of claim 8 wherein Pp is raised to $Pp_1$ in a pulse for a time period of at least about 1 second, and after said time period, $Pp_1$ is lowered to $Pp_2$ using the pressure controller on the permeate line.

14. The method of claim 8 wherein the pressure controller is a valve and the permeate pressure is increased by at least partially closing the valve.

15. The method of claim 8 further comprising providing at least one cleaning agent for cleaning said membrane to the filtering apparatus.

16. The method of claim 8, wherein $Pp_2$ is about $Pp_0$.

* * * * *